US007059846B2

(12) United States Patent
Bassi

(10) Patent No.: US 7,059,846 B2
(45) Date of Patent: Jun. 13, 2006

(54) ASSEMBLY FOR COMPRESSION MOLDING OF ARTICLES MADE OF PLASTICS

(75) Inventor: Giovanni Bassi, Via Portisano (IT)

(73) Assignee: Sacmi Cooperativa Meccanici Imola S.C.R.I., Imola (IT)

( * ) Notice: Subject to any disclaimer, the term of this patent is extended or adjusted under 35 U.S.C. 154(b) by 207 days.

(21) Appl. No.: 10/235,754

(22) Filed: Sep. 6, 2002

(65) Prior Publication Data

US 2003/0054064 A1    Mar. 20, 2003

(30) Foreign Application Priority Data

Sep. 14, 2001 (IT) .......................... BO2001A0557

(51) Int. Cl.
*B29C 45/43* (2006.01)
(52) U.S. Cl. ..................... 425/345; 425/809; 425/422; 425/349
(58) Field of Classification Search ........ 425/344–345, 425/809, 349, 422, 438, 453
See application file for complete search history.

(56) References Cited

U.S. PATENT DOCUMENTS

| 2,202,797 | A |   | 5/1940  | Soubier et al. |         |
|-----------|---|---|---------|----------------|---------|
| 2,851,727 | A |   | 9/1958  | Wilckens et al.|         |
| 3,053,221 | A | * | 9/1962  | Miller et al.  | 425/809 |
| 3,827,843 | A |   | 8/1974  | Blouch         |         |
| 4,274,822 | A |   | 6/1981  | Tamai et al.   |         |
| 4,336,011 | A | * | 6/1982  | George et al.  | 425/809 |
| 5,259,745 | A | * | 11/1993 | Murayama       | 425/110 |
| 5,786,079 | A | * | 7/1998  | Alieri         | 425/349 |
| 5,989,007 | A | * | 11/1999 | Ingram et al.  | 425/453 |

FOREIGN PATENT DOCUMENTS

EP        0 879 686        11/1998

OTHER PUBLICATIONS

Patent Abstract of Japan vol. 016, No. 561 (M-1341), Dec. 3, 1992 & JP 04 215966 A (Japan Crown Cork Co Ltd), Aug. 6, 1992 *abstract*.

* cited by examiner

*Primary Examiner*—Duane Smith
*Assistant Examiner*—Thu Khanh T. Nguyen
(74) *Attorney, Agent, or Firm*—Modiano & Associati; Albert Josif; Daniel O'Byrne

(57) ABSTRACT

An assembly for the compression molding of articles made of plastic material, composed of a main male plug and a complementary male plug which comprise a stem, actuated by an actuation element with a spindle guided in a tubular tang provided with a molding head cooperating with the main male plug; a first spring, arranged on the spindle acting between a collar of the spindle and the tubular tang; a second spring, arranged on the spindle acting on the collar or on the end of the tang that lies opposite the molding head, to determine an inactive molding step of the complementary male plug, a compression step, and a reduced compression step.

10 Claims, 5 Drawing Sheets

US 7,059,846 B2

ASSEMBLY FOR COMPRESSION MOLDING OF ARTICLES MADE OF PLASTICS

BACKGROUND OF THE INVENTION

The present invention relates to an assembly for compression molding of articles made of plastics.

An assembly of this kind is normally composed of a main male plug and a complementary male plug, which are coaxial and are actuated toward each other in order to mold a dose of plastic material deposited on the complementary male plug so as to form an article.

When the step of deformation of the plastic material has ended, it is necessary to keep the main male plug and the complementary male plug pushed against each other, in order to allow the plastic material that has not yet hardened to maintain its shape until the process of stabilization of the plastic material has ended with the forming of a solid article.

In known molding assemblies, in order to keep the shape of the article the main male plug and the complementary male plug are pushed against each other with the same compression force that determined the deformation of the plastic material. This force, by persisting over time, can cause damaging mechanical stresses on the main male plugs and complementary male plugs. However, currently no solutions have been devised that allow to reduce the compression force to a value that allows to maintain the shape of the article until it stabilizes.

SUMMARY OF THE INVENTION

The technical aim of the present invention is now to obviate the above cited shortcomings of known molding assemblies by providing a solution that is technically simple and functionally valid.

Within the scope of this technical aim, an object of the present invention is to provide a molding assembly that is suitable to be installed in carousel apparatuses for the compression molding of articles made of plastic material, which comprise a plurality of molding assemblies.

This aim and this object are achieved with an assembly for the compression molding of articles made of plastic material, composed of a main male plug and a complementary male plug and characterized in that said complementary male plug is composed of: a stem, which is actuated by an actuation element and comprises a spindle that is guided in a tubular tang provided with a molding head that cooperates with said main male plug; a first spring, which is arranged on said spindle and acts between a collar of said spindle and said tubular tang; and a second spring, which is arranged on said spindle and is suitable to act, with a center bearing interposed, on said collar or on the end of said tubular tang that lies opposite said molding head, so as to determine: an inactive step of the complementary male plug, during which said first spring actuates said spindle into a stable position for resting against a shoulder of said tang, while said center bearing is spaced from said end of the tang and said second spring is locked between said stem and said collar; a compression step, during which both springs act on said tubular tang and said spindle does not rest against said shoulder, while said collar is spaced from said center bearing; and a reduced compression step, during which said first spring acts on said tubular tang and said second spring is locked between said stem and said collar, while said spindle does not rest against said shoulder and said center bearing is spaced from said end of said tang.

Another object of the invention is to provide a carousel that comprises a plurality of molding assemblies having the characteristics defined in the appended claims.

BRIEF DESCRIPTION OF THE DRAWINGS

Further details of the invention will become better apparent from the following description of a preferred embodiment thereof, illustrated by way of non-limitative example in the accompanying drawings, wherein:

FIG. 1 illustrates a carousel for molding articles made of plastic material, disclosed in copending patent application by the same Applicant, entitled "Apparatus for molding and applying liners in caps", claiming Italian priority N° BO2001A000555, and to which reference is made here for better comprehension of the present invention.

DESCRIPTION OF THE PREFERRED EMBODIMENTS

Figure 1:
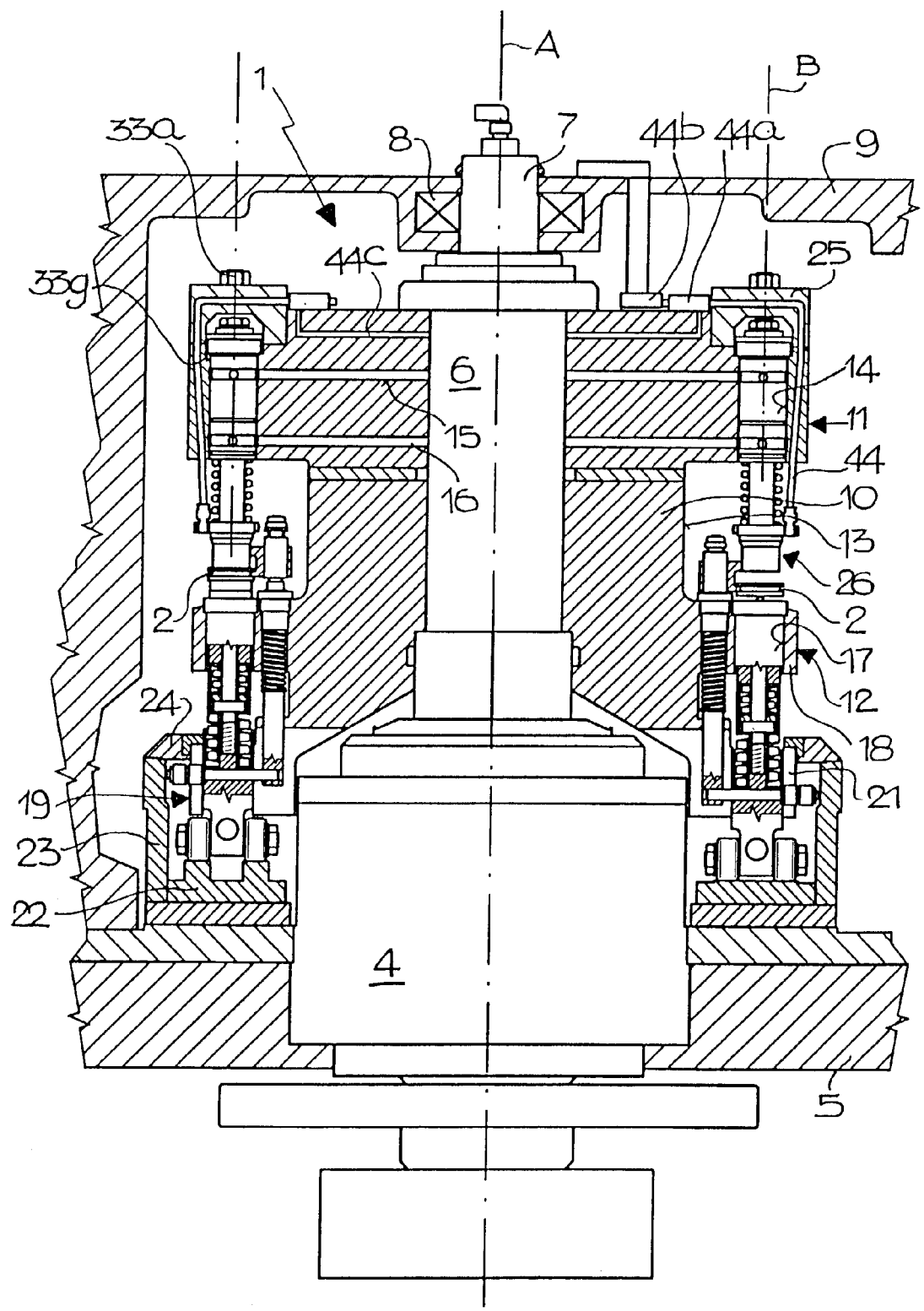
FIG. 1 is a sectional view of a carousel for molding articles, equipped with molding assemblies according to the invention.

The carousel is generally designated by the reference numeral 1 and is part of an apparatus for molding and applying liners made of plastic material in caps. The plastic material, by means of a dosage machine that is not shown, is deposited in doses on shuttles which, by way of transfer elements, are conveyed into the illustrated molding carousel 1, where the doses are compressed on the shuttles so as to form disk-like liners that are designated by the reference letter G in FIG. 2. The liners are then conveyed onto another carousel, where they are removed from the shuttles and inserted in the caps.

Figure 2:
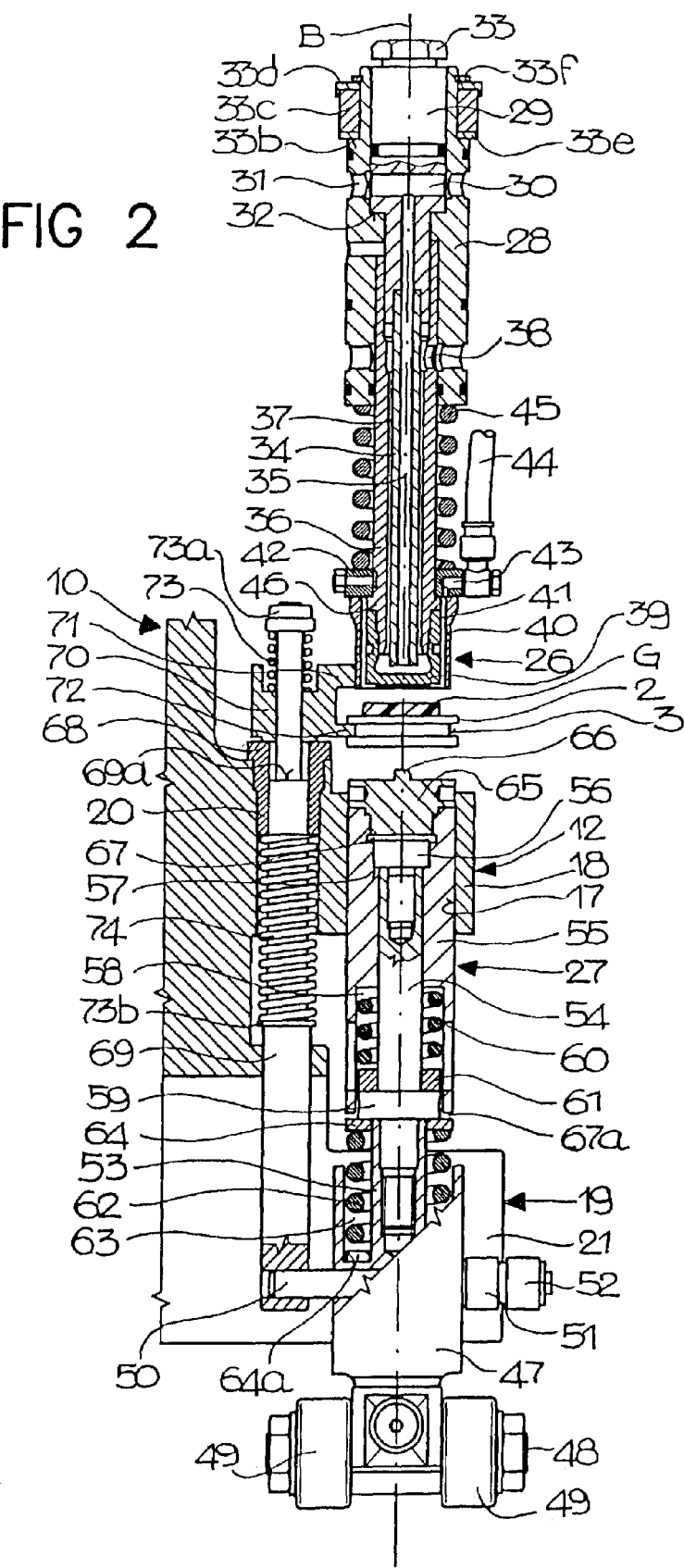
FIG. 2 is an enlarged-scale sectional view of a molding assembly.

As shown by FIG. 2, the shuttles are designated by the reference numeral 2 and are shaped like disks provided with an external slot 3.

The molding carousel 1 comprises a cylindrical box 4, which is rigidly coupled to the footing 5 and in which a vertical shaft 6 is supported rotatably; said shaft has an axis A and is turned by transmission elements, not shown in the drawings. The top end 7 of the shaft 6 is supported, by means of a bearing 8, by a structure 9 that rises from the footing 5. A drum 10 is keyed on the vertical shaft 6 and has an upper annular portion 11 and a lower annular portion 12, between which there remains an annular recess 13. The upper annular portion 11 has a plurality of cylindrical through seats 14, whose axis B is parallel to the rotation axis A. The seats 14 are concentric to the axis A and angularly equidistant.

In the upper annular portion 11 there are multiple upper channels 15 and lower channels 16, which run radially and connect the respective cylindrical seats 14 to a source of cooling fluid. A further plurality of cylindrical seats 17 is formed coaxially to the seats 14, in the lower annular portion 12.

The lower portion 12 has an annular cavity that divides it into two superimposed collars 18 and 19, both of which are crossed by the seats 17. In the upper collar 18 there is a respective additional cylindrical seat 20 (see also FIG. 2) that is radially internal with respect to each cylindrical seat 17 and is parallel to said seat.

In the lower collar 19 there are multiple vertical slits 21, which are arranged radially and whose central planes contain the axes of the corresponding cylindrical seats 17 and 20. An annular axial cam 22 rests under the drum 10 on the footing 5, is concentric to the axis A, and comprises two vertically elongated concentric profiles. The cam 22 and the lower collar 19 are protected by a cylindrical jacket 23, which has an upper edge 24 that skims the outer edge of the collar 19.

Each one of the upper cylindrical seats 14 is closed in an upward region by an L-shaped body 25 and accommodates a main male plug, generally designated by the reference numeral 26, which together with a respective complementary male plug 27 accommodated in the seats 17 forms one of the assemblies for molding the liners G. The main male plug 26 of each molding assembly is composed of a sleeve 28, which is permanently inserted in the seat 14 and is closed in an upward region by a cylindrical head 29 that is slidingly and hermetically engaged in said sleeve and is provided with a diametrical hole 30 which is connected, through holes 31 of the sleeve 28, to a respective channel 15 of the portion 11 of the drum 10. The head 29 has a step for resting against a shoulder 32 of the sleeve 28 and a screw 33 is screwed into its top end; a screw 33a having an axis B (see FIG. 1) and screwed through the L-shaped body 25 acts on said screw 33. The upper end portion of the sleeve 28 has an outer step 33b, on which there rests a ring made of rubber-like material 33c, compressed between two metallic center bearings 33d and 33e and retained by an elastic ring 33f. The ring 33c rests against a shoulder 33g of the seat 14. In this manner, by acting on the screw 33a it is possible to preload the ring 33c against the shoulder 33g and therefore the main male plug 26. The head 29 has a tubular extension to which a cannula 34 is connected; said cannula forms a channel 35 that is connected to the diametrical hole 30. The cannula 34 lies inside a tubular stem 36, forming with it an interspace 37, which is connected, by means of holes 38 of the tubular stem and of the sleeve, to a respective radial channel 16. At the lower end, the tubular stem 36 is closed by a molding element that is constituted by a sort of cup 39, which connects the interspace 37 to the channel 35. The cup 39, whose bottom constitutes the actual male plug, is accommodated in a bush 40, whose inside diameter is greater than the outside diameter of the cup, so that an annular gap or interspace 41 is formed between them. The bush 40 is rigidly coupled to a ring 42, which can slide on the stem 36 and in which there is a passage 43 that connects the gap 41 to a hose 44 for delivering compressed air. Each hose 44 is connected to a respective valve 44a, which is actuated cyclically as the carousel turns by an abutment 44b that is fixed to the structure 9. The valve 44a cyclically connects the hose 44 to a duct 44c for feeding compressed air. The ring 42, by means of a spring 45 that is interposed between said ring and the sleeve 28, is actuated so as to rest against a shoulder 46 of the tubular stem 36. Conveniently, the length of the bush 40 is such that in the position in which it rests against the shoulder 46 its lower edge protrudes below the cup 39. Furthermore, the diameter of the bush 40 is smaller than the outside diameter of the shuttle 2.

The complementary male plug 27 comprises a stem 47 crossed by a radial pivot 48, which supports two free rollers 49 that engage, by rolling thereon, the pair of profiles of the cam 22 that is fixed to the footing 5. A pin 50 is driven through the stem 47 and rotatably supports an additional upper pair of rollers 51 and 52. Both rollers are arranged at the end of the pin that is external to the stem 47 relative to the axis B. The roller 51 engages the vertical slit 21 of the collar 19, while the roller 52 can engage a sector that is fixed inside the cylindrical case 23. The stem 47 contains a threaded bush 53, into which the threaded end of a cylindrical spindle 54 is screwed; said spindle is mounted so that it can slide in a tubular tang 55, to the top of which a screw 56 is screwed whose head has a larger diameter than the sliding hole of the spindle, so as to be able to abut against a shoulder 57 of the tubular tang 55. A recess 58 is formed in said tubular tang and accommodates a ring 59, which is monolithic with the spindle 54, and a spring 60, which acts between the tang 55 and the ring 59, with a spacer ring 61 interposed, so as to actuate the head of the screw 56 into abutment against the shoulder 57. An additional spring 62 is accommodated in a recess 63 of the stem 47 that surrounds the bush 53 so as to act, with a center bearing 64 interposed, against the lower edge of the tang 55 and act as a resting element for the ring 59. The spring 62 rests on the bottom of the recess 63 with a spacer ring 64a. The rings 61 and 64a allow to adjust the preloading of the springs 60 and 62. A seat is provided at the top end of the tubular tang 55, and a shuttle holder insert 65 is screwed therein; said insert has a central pivot 66, which is suitable to engage in the central hole of the shuttle 2 so as to constitute, together with said shuttle, a molding head. An interspace 67 remains between the insert 65 and the head of the screw 56 and allows the spindle 54 to perform a short stroke with respect to the tang 55 in contrast with the return action applied by the spring 60. When the head of the screw 56 rests on the shoulder 57, an interspace 67a that is not as high as the interspace 67 is formed between the center bearing 64 and the lower edge of the tubular tang 55.

A bush 68 is fixed in each one of the cylindrical seats 20, and a rod 69 can slide therein; the pin 50 is inserted in a downward region in said rod. The rod 69 has an upper portion that has a reduced diameter and forms inside the bush 68 an abutment 69a, which protrudes out of the bush 68. A block 70 is fixed slidingly on said portion, and two superimposed forks 71 and 72 protrude from said block; the prongs of said forks form two semicircular curves: the upper one is suitable to receive the bush 40 and the lower one is suitable to receive the slot 3 of the shuttle 2. The numeral 73 designates a spring that is interposed between the block 70 and a nut 73a that is screwed onto the end of the rod 69. The purpose of the spring 73 is to actuate the block 70 downward in order to keep it rested against the abutment 69a when the rod 69 is actuated upward by the cam 22 together with the stem 47. A washer 73b is arranged on the rod 69, and a spring 74 rests therein in abutment against the lower edge of the bush 68 that guides the rod 69.

The operation of the described carousel is as follows.

The shuttles 2, already provided with a dose of plastic material preformed in the dosage machine, are transferred by an appropriate transfer element onto the molding carousel 1, where they are accommodated in the recesses formed between the prongs of the lower forks 72 that engage in the slot 3 of said shuttles.

The shuttles 2 are then locked by the subsequent upward stroke of the complementary male plugs 27, which are actuated by the cam 22 that causes the engagement of the pins 66 in the holes of the shuttles 2 so that they cannot escape from the seats between the prongs 72 of the block 70.

As the upward stroke of the complementary male plugs continues, the shuttles 2 make contact with the lower edge of the bushes 40 and therefore actual molding begins, compressing the doses of plastic material previously deposited on the shuttles 2 against the bottoms of the cups 39 so as to form circular liners G.

The molding performed by each assembly composed of a main male plug 24 and a complementary male plug 27 occurs according to the following sequence.

Figure 3:
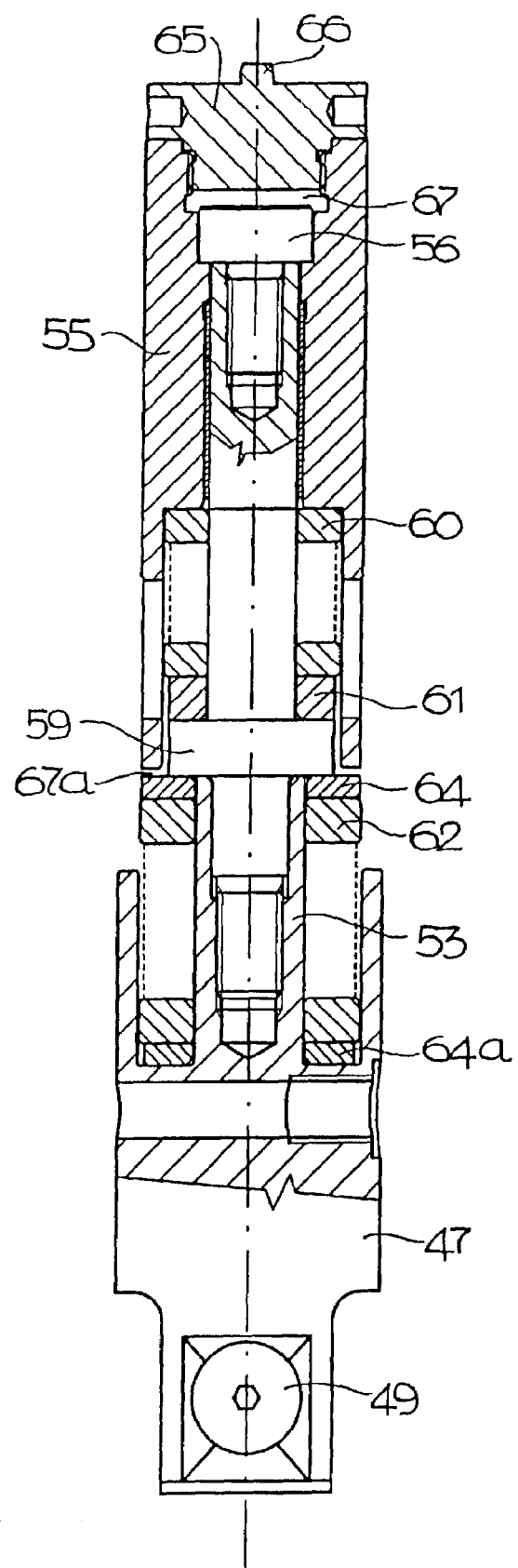
FIGS. 3, 4 and 5 are views of three successive operating conditions of the molding assembly.

In the initial position (shown in FIGS. 2 and 3), i.e., when the resistance to compression offered by the dose is not yet significant, the screw 56 abuts against the abutment 57 and the spring 62 is locked, in the preloaded condition, between the bottom of the recess 63 and the collar 59 of the spindle 54. The interspace 67a between the center bearing 64 and the edge of the tang 55, owing to the preloading of the spring 60, remains unchanged.

As the resistance offered by the plastic material increases as the stem 47 and the spindle 54 rigidly coupled thereto rise, the spindle 54 moves with respect to the tang 55, so that the center bearing 64 stops against the lower edge of the tang 55, allowing the collar 59 to move away from it.

Figure 4:
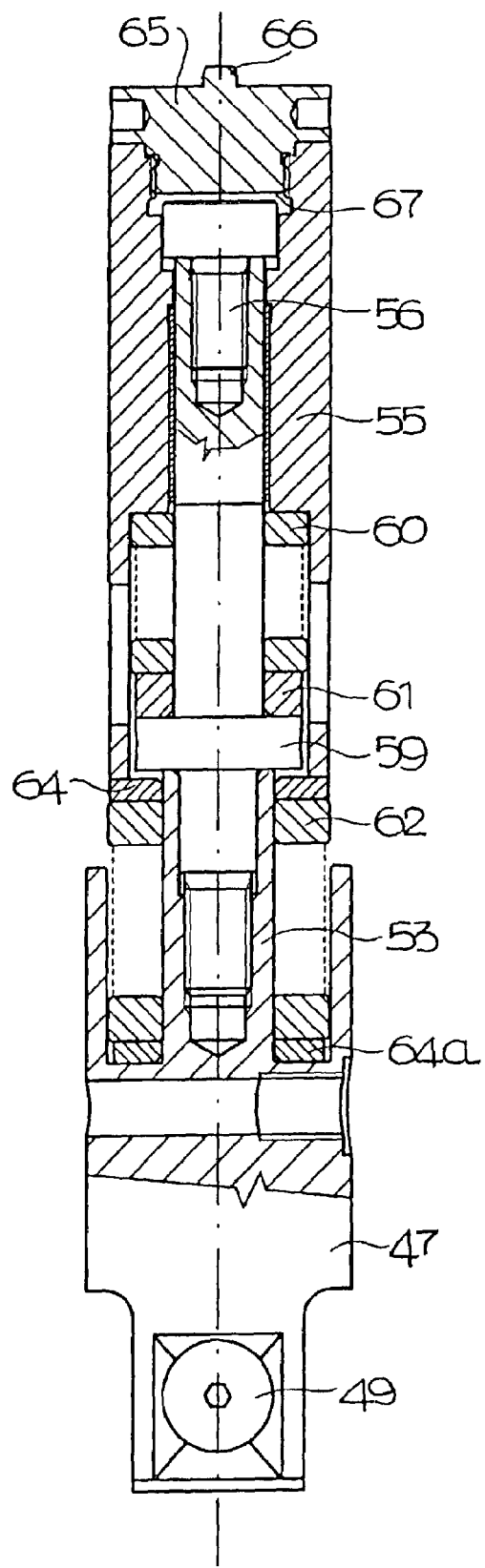

At this point one has the situation of FIG. 4, in which the maximum compression thrust applied by the cam 22 is transmitted to the tang 55 and therefore to the shuttles 2 by means of the two springs 60 and 62, which are arranged in parallel.

Figure 5:
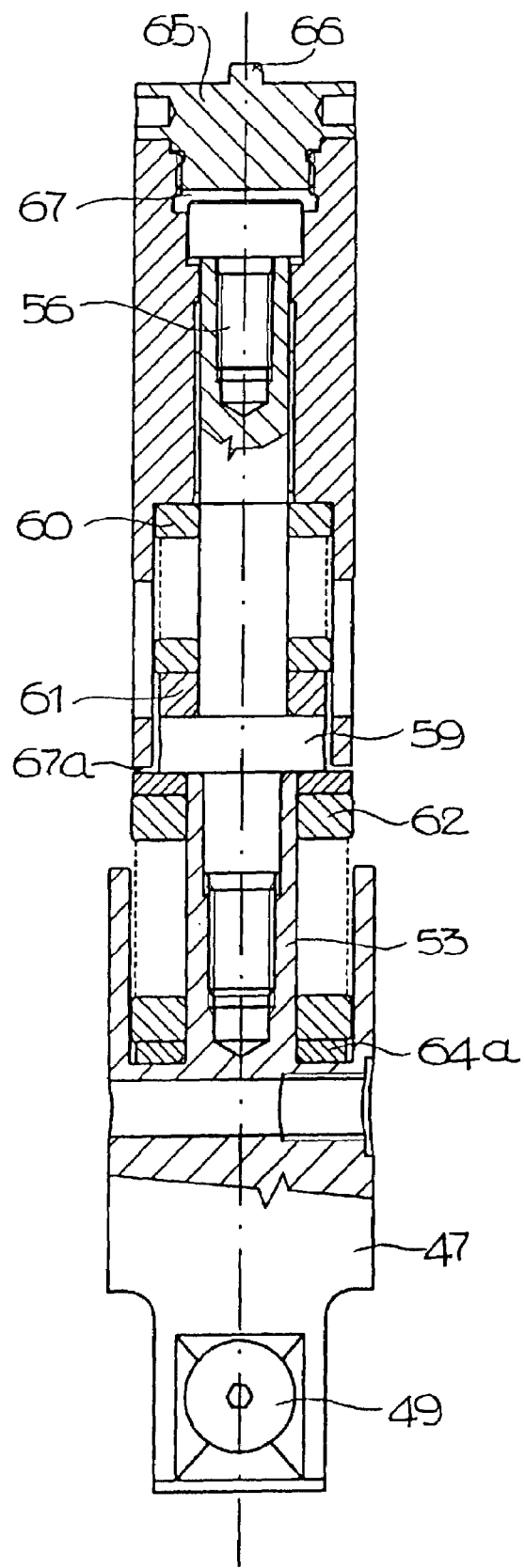

The doses of plastic material are sized so as to widen due to compression until they occupy the entire chamber comprised between the shuttle 2 and the bottom of the cup 39 and is surrounded peripherally by the bush 40. Once the liners G have been molded, the cam 22 allows the spindles 54 to descend, so as to allow the ring 59 to abut against the center bearing 64 and therefore, by descending further, to entrain it under the edge of the tang 55, so as to render ineffective the lower spring 62, which is locked once again between the ring 59 and the stem 47 (see FIG. 5). When the center bearing 64 descends below the edge of the tang 55, the compression with which the complementary male plug 27 acts on the liner, which is molded by then, is applied only by the upper spring 60 and is maintained by it by way of the cam 22 for a rotation angle of the carousel 1 that is sufficient to ensure that the shape of the liners is maintained until it has stabilized.

Once the molding step has ended with the spacing of the complementary male plug 27 from the main male plug 26, the shuttles that support the already-formed liners G are then transferred onto an insertion carousel, where the liners G are separated from the shuttles 2 along a first arc of rotation and the liners are inserted in caps along a subsequent arc.

It is evident that the assemblies according to the invention perfectly achieve the intended aim and objects. In particular, it is possible to reduce the compression force after molding the liners to a value that maintains the shape of the liners until it has stabilized yet reduces the mechanical stresses on the main male plugs and complementary male plugs.

The invention can of course be applied also in carousels that do not have shuttles and in which the molding heads are integrated in the inserts 65 so that the plastic material is compressed between the cup-like element 39 and the upper face of the insert 65.

The disclosures in Italian Patent Application No. BO2001A000557 from which this application claims priority are incorporated herein by reference.

What is claimed is:

1. An assembly for compression molding of articles made of plastic material, composed of a main male plug and a complementary male plug, said complementary male plug comprising: a stem; an actuation element for actuating said stem; a tubular tang having a shoulder; a spindle guided in said tubular tang; a molding head, provided at said spindle to cooperate with said main male plug; a ring provided at said spindle; a first spring, arranged on said spindle so as to bear on and to act between said ring and said tubular tang; a center bearing arranged at said ring; a second spring arranged on said spindle so as to bear on said center bearing and to act thereon and on said ring or on an end of said tubular tang that lies opposite said molding head in operative configurations comprising: an inactive configuration of the complementary male plug, during which said first spring actuates said spindle into a stable position for resting against the shoulder of said tang, while said center bearing is spaced from said end of the tang opposite said molding head, and said second spring is locked between said stem and said ring; a compression configuration, during which the first and second springs act on said tubular tang and said spindle is spaced away from said shoulder, while said ring is spaced from said center bearing; and a reduced compression configuration, during which said first spring acts on said tubular tang and said second spring is locked between said stem and said ring, while said spindle is spaced away from said shoulder and said center bearing is spaced from said end of said tang.

2. The assembly of claim 1, further comprising spacer rings arranged between said first spring and said ring and, respectively, between said second spring and said stem.

3. The assembly of claim 2, comprising an actuation cam and rollers provided at said stem, movement of said stem being controlled by said actuation cam in contact with said rollers.

4. A carousel for molding articles made of plastic material, including a plurality of molding assemblies having the features set forth in claim 1; a drum that rotates about a vertical axis and supporting said plurality of molding assemblies, each molding assembly being provided with a complementary male plug, and having an upper annular portion and a lower annular portion each of which is provided with respective coaxial and equidistant seats that are arranged concentrically around the rotation axis of said drum, in order to accommodate said main male plug and said complementary male plug of each assembly, each one of said main male plugs comprising: elastic return means; a bush; a molding element arranged inside said bush that is slidable on said molding element in contrast with said elastic return means and forms, together with said molding element, an annular interspace; a delivery of compressed air, connected to said annular interspace; with each one of said complementary male plugs comprising a said stem that is movable under control of a said axial cam that is stationary with respect to and concentric to said rotation axis.

5. The carousel of claim 4, comprising a plurality of disk-like shuffles each arranged at a top end of said complementary male plug and containing a respective molding head and each being provided wit a perimetric slot; inserts each of which is rigidly coupled to the top of said tubular tang; and respective pivots protruding from said insert and retaining said shuttle at said top end of the complementary male plug.

6. The carousel of claim 5, comprising, for each molding assembly,: a rod coupled to said stem and slidable in a seat of said lower annular portion parallel to said main male plug; a block fixed to said rod, said block having two superimposed forks that form respective curves that are adapted to engage on said bush and, respectively, in said slot of the shuttle in order to lift said shuttle against said main male plug, when said complementary male plug is lifted to mold the article.

7. An assembly for an apparatus for compression molding of articles made of plastic material, composed of a main male plug and a complementary male plug that are mounted in seats that are fanned coaxial in respective superimposed collars of the apparatus, said complementary male plug comprising: a stem; an actuation element for actuating said stein; a tubular rang having a shoulder; a spindle guided in said tubular tang; a molding head, provided at said spindle to cooperate with said main male plug; a ring provided at said spindle; a first spring, arranged on said spindle to bear on and act between said ring and said tubular tang; a center bearing arranged at said ring; a second spring arranged on said spindle so as to bear on said center bearing and to act thereon and on said ring or on an end of said tubular tang that lies opposite, said molding head in operative configurations comprising: an inactive configuration of the complementary male plug, during which said first spring actuates said spindle into a stable position for resting against the shoulder of said tang, while said center bearing is spaced from said end of the tang opposite said molding head, and said second spring is locked between said stem and said ring; a compression configuration, during which the first and second springs act on said tubular tang and said spindle is spaced away from said shoulder, while said ring is spaced from said center bearing; and a reduced compression configuration, during which said first spring acts on said tubular tang and said second spring is locked between said stein and said ring, while said spindle is spaced away from said shoulder and said center bearing is spaced from said end of said tang.

8. The assembly of claim 7, further comprising spacer rings arranged between said first spring and said ring and, respectively, between said second spring and said stem.

9. The assembly of claim 8, comprising an actuation cam and rollers provided at said stem, movement of said stem being controlled by said actuation cam in contact with said rollers.

10. An assembly for compression molding of articles made of plastic material, composed of a main male plug and a complementary male plug, said complementary wale plug comprising: a stem; an actuation element for actuating said stem; a tubular tang having a shoulder; a spindle guided in said tubular tang; a molding head, provided at said spindle to cooperate with said main male plug; a ring rigidly connected to said spindle; a first spring, arranged on said spindle interposed between said ring and said tubular tang; a center bearing arranged at said ring; a second spring, arranged on said spindle interposed between said center bearing and said stem for action on said center bearing and said rind or on an end of said tubular tang that lies opposite said molding head, and wherein said molding bead in operative configurations comprises: an inactive configuration of the complementary wale plug, during which said first spring actuates said spindle into a stable position for resting against the shoulder of said tang, while said center bearing is spaced from said end of the tang opposite said molding head, and said second spring is locked between said stem and said ring; a compression configuration, during which the first and second springs act on said tubular tang and said spindle is spaced away from said shoulder, while said ring is spaced from said center bearing; and a reduced compression configuration, during which said first spring acts on said tubular tang and said second spring is locked between said stem and said ring, while said spindle is spaced away from said shoulder and said center bearing is spaced from said end of said tang.

* * * * *

UNITED STATES PATENT AND TRADEMARK OFFICE
CERTIFICATE OF CORRECTION

PATENT NO. : 7,059,846 B2 Page 1 of 1
APPLICATION NO. : 10/235754
DATED : June 13, 2006
INVENTOR(S) : Giovanni Bassi It is certified that error appears in the above-identified patent and that said Letters Patent is hereby corrected as shown below:

Title Page
Item (73) Assignee should read: SACMI COOPERATIVA MECCANICI IMOLA S.C.R.L., Imola (IT)

Signed and Sealed this

Twelfth Day of September, 2006

JON W. DUDAS
*Director of the United States Patent and Trademark Office*